United States Patent
Jaradi et al.

(10) Patent No.: US 10,946,826 B2
(45) Date of Patent: Mar. 16, 2021

(54) VEHICLE SEAT AND AIRBAG

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); Saeed David Barbat, Novi, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 16/156,583

(22) Filed: Oct. 10, 2018

(65) Prior Publication Data

US 2020/0114857 A1    Apr. 16, 2020

(51) Int. Cl.
| | |
|---|---|
| *B60R 21/207* | (2006.01) |
| *B60R 21/215* | (2011.01) |
| *B60R 21/264* | (2006.01) |
| *B60R 21/231* | (2011.01) |
| *B60R 21/2338* | (2011.01) |

(52) U.S. Cl.
CPC .......... *B60R 21/207* (2013.01); *B60R 21/215* (2013.01); *B60R 21/231* (2013.01); *B60R 21/264* (2013.01); *B60R 21/2338* (2013.01)

(58) Field of Classification Search
CPC ... B60R 21/207; B60R 21/264; B60R 21/215; B60R 21/231; B60R 21/26
See application file for complete search history.

(56) References Cited

U.S. PATENT DOCUMENTS

| | | | | |
|---|---|---|---|---|
| 6,308,917 | B1 * | 10/2001 | Ruff ................... | B64D 25/02 |
| | | | | 244/122 AG |
| 7,318,601 | B2 * | 1/2008 | Sugimoto ............. | B60R 21/207 |
| | | | | 280/730.1 |
| 9,573,553 | B2 | 2/2017 | Ko et al. | |
| 9,919,673 | B2 * | 3/2018 | Ohno ................... | B60R 21/262 |
| 9,925,943 | B2 | 3/2018 | Ohno et al. | |
| 2003/0001372 | A1 * | 1/2003 | Browne ............... | B60R 21/045 |
| | | | | 280/751 |
| 2013/0015642 | A1 | 1/2013 | Islam et al. | |
| 2016/0297392 | A1 * | 10/2016 | Schneider ............ | B60R 21/206 |
| 2017/0203711 | A1 * | 7/2017 | Ohno ................... | B60R 21/231 |
| 2017/0334383 | A1 * | 11/2017 | Paxton ............... | B60R 21/0136 |
| 2018/0222432 | A1 * | 8/2018 | Schneider ............ | B60R 21/214 |
| 2018/0236962 | A1 * | 8/2018 | Ohno ................... | B60R 21/207 |
| 2019/0016288 | A1 * | 1/2019 | Schneider ............ | B60R 21/207 |
| 2019/0381965 | A1 * | 12/2019 | McCool ........... | B60R 21/01512 |
| 2020/0017052 | A1 * | 1/2020 | Deng ................... | B60R 21/055 |
| 2020/0094772 | A1 * | 3/2020 | Markusic ........... | B60N 2/42727 |

FOREIGN PATENT DOCUMENTS

| | | | | |
|---|---|---|---|---|
| DE | 102018119864 | A1 * | 2/2019 | ........ B60R 21/2342 |
| JP | 4603439 | B2 | 12/2010 | |

* cited by examiner

*Primary Examiner* — Karen Beck
(74) *Attorney, Agent, or Firm* — Frank A. MacKenzie; Bejin Bieneman PLC

(57) ABSTRACT

A system includes a seat back including a housing having a chamber, a frame in the chamber and deployable from the housing above the seat back, an airbag supported by the frame, and a pyrotechnic device in fluid communication with the chamber.

19 Claims, 8 Drawing Sheets

VEHICLE SEAT AND AIRBAG

BACKGROUND

Vehicles include seats to support occupants. The seats each include a seat back and a seat bottom. The seat bottom supports an occupant vertically. The seat back may be adjustable by an occupant by rotating the seat back relative to the seat bottom. The seat may be adjustable by the occupant by moving the seat in a vehicle fore-aft direction, e.g., to accommodate the occupant's legs. For example, the occupant may move the seat along a track to a specified position.

An interior of a vehicle, such as an automobile, may include various devices for absorbing energy from a test dummy of the vehicle during an impact test. For example, the vehicle may include an airbag supported by a steering wheel or a vehicle seat. The airbag may be configured to absorb energy from the test dummy during a vehicle impact.

DETAILED DESCRIPTION

Figure 1:
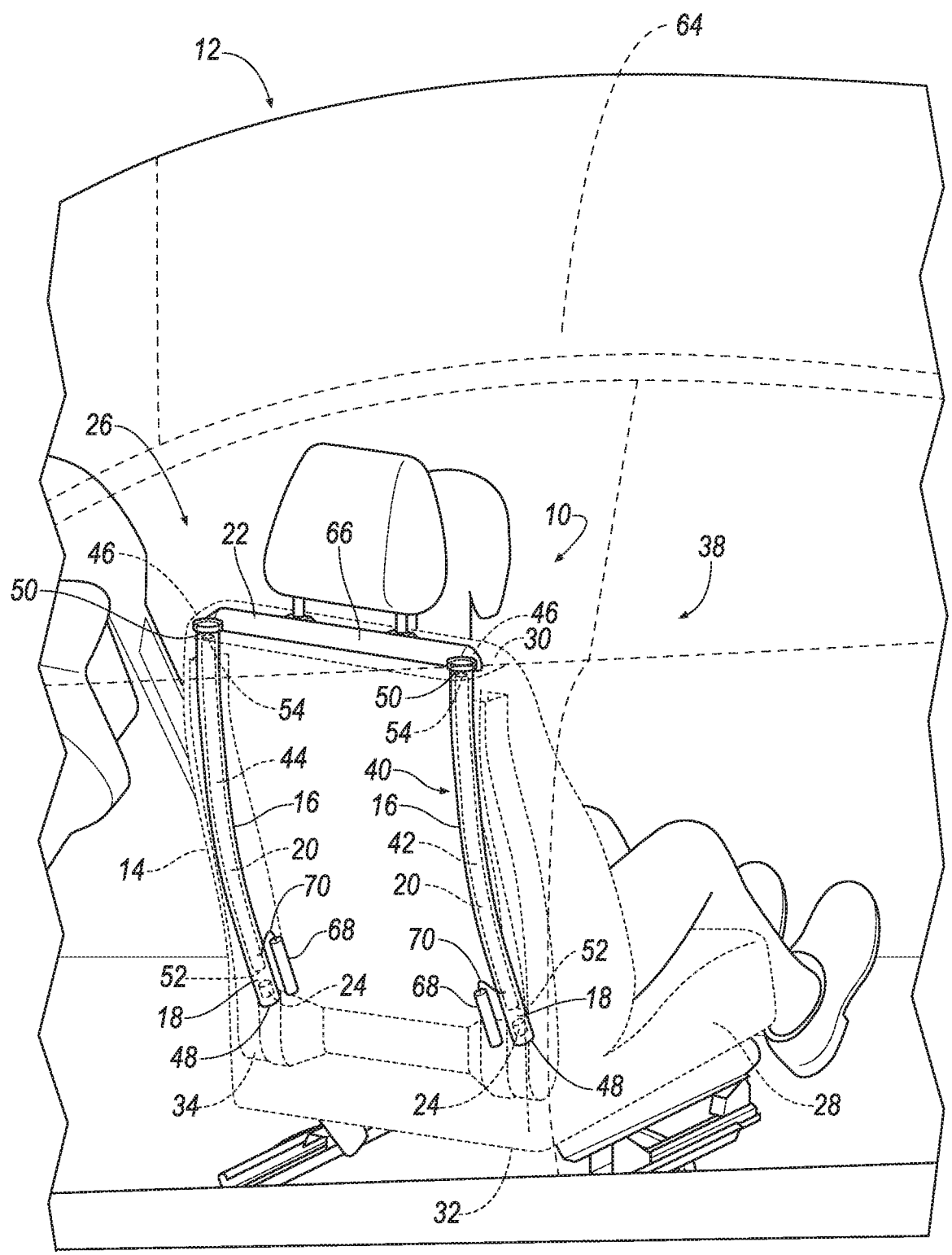
FIG. 1 is a perspective view of a vehicle seat.
Figure 2:
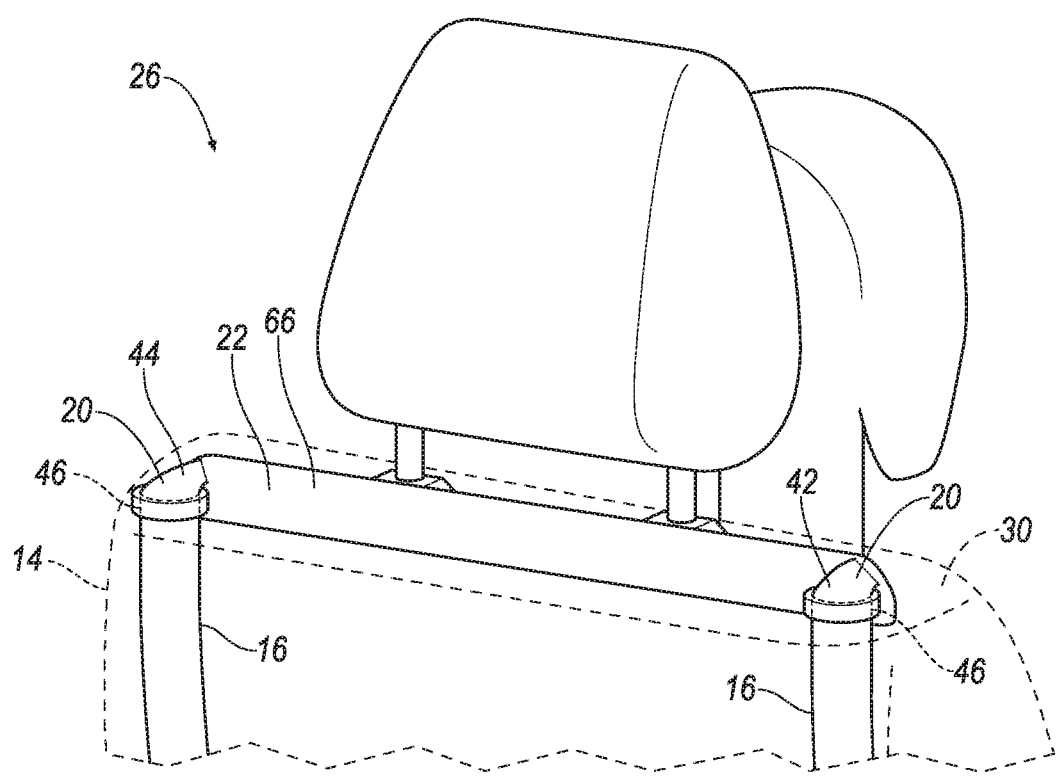
FIG. 2 is a magnified view of an airbag assembly.

A system includes a seat back including a housing having a chamber, a frame in the chamber and deployable from the housing above the seat back, an airbag supported by the frame, and a pyrotechnic device in fluid communication with the chamber.

The system may further include a roof. The airbag may be inflatable to an inflated position in which the airbag engages the roof. The seat back may have a bottom and the airbag may extend from the roof to below the bottom.

The seat back may have a bottom and the airbag may be inflatable to an inflated position in which the airbag extends below the bottom of the seat back.

The seat back may include a seat back frame and the housing may be supported by the seat back frame.

The pyrotechnic device may be supported by the seat back. The pyrotechnic device may be in the chamber.

The housing may be fixed to the seat back. The housing may be integral with the seat back.

The housing may taper from a first end to a second end. The frame may taper from a first end to a second end.

The seat back may define an occupant seating area. The frame may be beyond the occupant seating area.

The airbag may include a pair of side panels and a front panel between the side panels. The seat back may define an occupant seating area. The airbag may be inflatable to an inflated position in which the occupant seating area is between the side panels and below the front panel.

The frame may be rigid relative to the airbag.

The frame may include a first member and a second member spaced from the first member. The airbag may be supported by the first member and the second member.

The system may further include a cover. The airbag may be disposed in the cover.

With reference to the Figures, wherein like numerals indicate like parts throughout the several views, a system 10 in a vehicle 12 includes a seat back 14 that includes a housing 16, 16' having a chamber 18, a frame 20, 20' in the chamber 18 and deployable from the housing above the seat back 14, an airbag 22 supported by the frame 20, 20' and a pyrotechnic device 24 in fluid communication with the chamber 18.

Using the pyrotechnic device 24 to deploy the frame 20, 20' above the seat back 14 allows the airbag 22 to inflate over the seat back 14. Because the airbag 22 is supported by the seat back 14, the airbag 22 may control the kinematics of a test dummy when a seat 26 is rotated away from a vehicle-forward direction. The airbag 22 may extend below the seat back 14, controlling the kinematics of both an upper portion of the test dummy, e.g., a chest of the test dummy, and a lower portion of the test dummy, e.g., legs of the test dummy.

The vehicle 12 includes the seat 26, as shown in FIGS. 1-5. The seat 26 includes the seat back 14 and a seat bottom 28. The seat back 14 may be supported by the seat bottom 28 and may be stationary or movable relative to the seat bottom 28. The seat back 14 and/or the seat bottom 28 may be adjustable in multiple degrees of freedom. Specifically, the seat back 14 and/or the seat bottom 28 may themselves be adjustable, in other words, adjustable components within the seat back 14 and/or the seat bottom 28, and/or may be adjustable relative to each other. The seat back 14 has a top 30 and a bottom 32.

The seat back 14 may include a seat back frame 34 and a covering 36 supported on the seat back frame 34, as shown in FIGS. 1-5. The seat back frame 34 may include tubes, beams, etc. The seat back frame 34 may be formed of any suitable plastic material, e.g., carbon fiber reinforced plastic (CFRP), glass fiber-reinforced semi-finished thermoplastic composite (organosheet), etc. As another example, some or all components of the seat back frame 34 may be formed of a suitable metal, e.g., steel, aluminum, etc.

The covering 36 may include upholstery and padding. The upholstery may be formed of cloth, leather, faux leather, or any other suitable material. The upholstery may be stitched in panels around the frame. The padding may be between the covering 36 and the seat back frame 34 and may be foam or any other suitable material.

The seat back 14 may define an occupant seating area 38, as shown in FIGS. 1, 3-5. The occupant may be disposed in the occupant seating area 38. The occupant seating area may be on a front side of the seat back 14. As described below, the airbag 22 may extend from the seat back 14 over the occupant seating area 38 to control the kinematics of the test dummy.

The seat back 14 includes the housing 16, 16' as shown in FIGS. 1-7. The housing 16, 16' may be fixed to the seat back 14. For example, the housing 16, 16' may be fixed to the seat back frame 34, i.e., having a direct connection to the seat back frame 34. Alternatively, not shown in the Figures, the housing 16, 16' may be integral with the seat back 14, i.e., formed as a unitary construction with the seat back 14. The housing 16, 16' includes the chamber 18. As described below, the housing 16, 16' houses the airbag 22 and the frame 20.

The system 10 includes an airbag assembly 40, 40' as shown in FIGS. 1, 3-7. The airbag assembly 40, 40' includes the frame 20, 20' and the airbag 22. The airbag assembly 40, 40' is disposed in the chamber 18 of the housing 16, 16'. The airbag assembly 40, 40' is deployable from the housing 16, 16' to a deployed position.

The system 10 includes the frame 20, 20', as shown in FIGS. 1-7. The frame 20 is disposed in the chamber 18 of the housing 16, 16'. The housing 16, 16' is deployable from the housing 16, 16' to a deployed position. In the deployed position, the frame 20, 20' is above the seat back 14. The frame 20, 20' may include a first member 42 and a second member 44 spaced from the first member 42. The frame may include a third member, not shown in the Figures, connecting the first member 42 and the second member 44. The frame 20, 20' may extend beyond the occupant seating area 38. Deploying the frame 20, 20' above the seat back 14 allows the airbag assembly 40 to extend over the test dummy. The frame 20, 20' may be a suitable material, e.g., plastic, metal, etc.

The seat back 14 may include a lock 46, as shown in FIGS. 1-4. The lock 46 may secure the frame 20, 20' to the housing 16, 16' preventing the frame 20, 20' from extending beyond the deployed position. For example, the lock 46 may be a spring-loaded tab that engages a notch in the frame 20, securing the frame 20 to the housing 16 when the tab engages the notch. The seat back 14 may include respective locks 46 for the first member 42 and the second member 44 of the frame 20.

Figure 7:
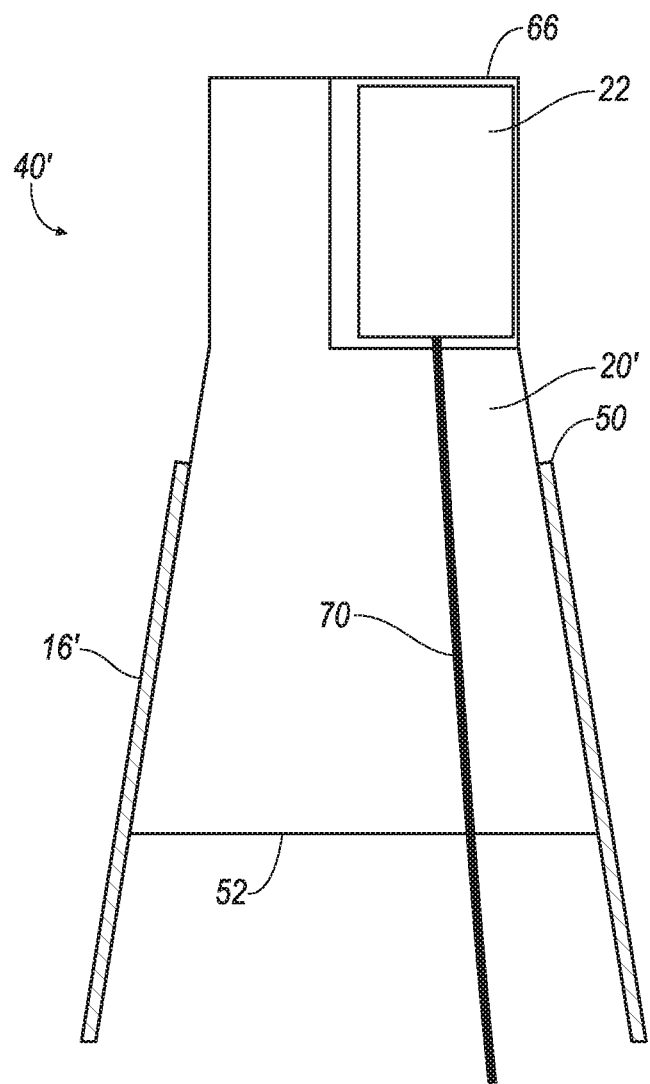
FIG. 7 is a magnified view of a second embodiment of the airbag assembly.

As another example, as shown in FIG. 7, the housing 16' may taper from a first end 48 to a second end 50 and the frame 20' may taper from a first end 52 to a second end 54. A diameter of the first end 52 of the frame 20' may be greater than a diameter of the second end 50 of the housing 16', and when the frame 20' is deployed, the first end 52 of the frame 20' may engage the second end 54 of the housing 16' with a friction fit, securing the frame 20' to the housing 16'.

The airbag assembly 40, 40' includes the airbag 22, as shown in FIGS. 1-9. The airbag 22 is supported by the frame 20, 20'. For example, the airbag 22 may be supported by the first member 42 and the second member 44. The airbag 22 may extend along the top 30 of the seat back 14 from the first member 42 to the second member 44. The airbag 22 may be disposed beneath the covering 36, i.e., concealed by the covering 36, prior to deployment. The frame 20, 20' may be rigid relative to the airbag 22. When the airbag assembly 40, 40' is in the deployed position, the airbag 22 may inflate from the frame 20, 20' over the seat back 14. The airbag 22 may be formed of a woven polymer or any other material. As one example, the airbag 22 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 4:
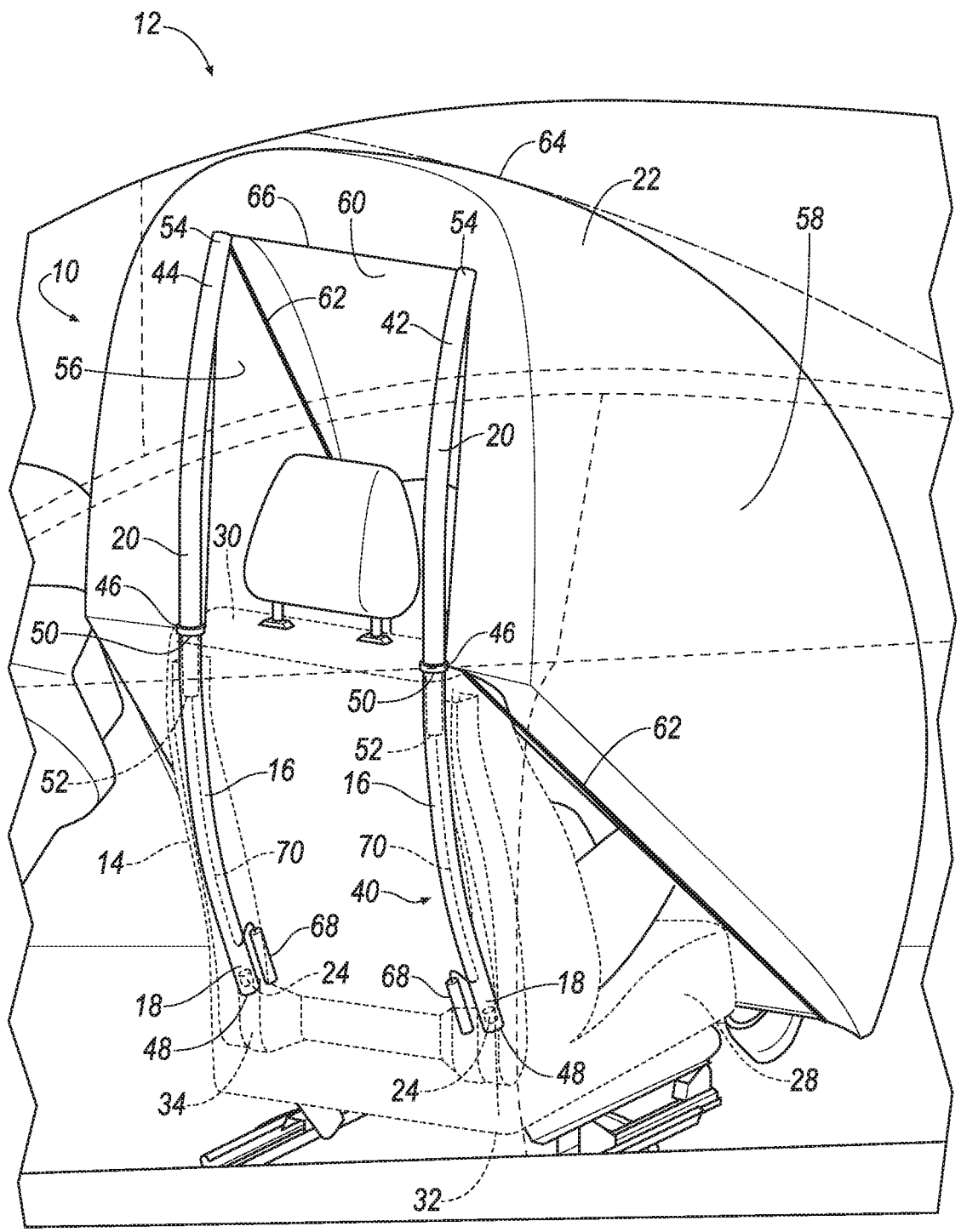
FIG. 4 is a perspective view of an airbag of the airbag assembly in an inflated position.
Figure 5:
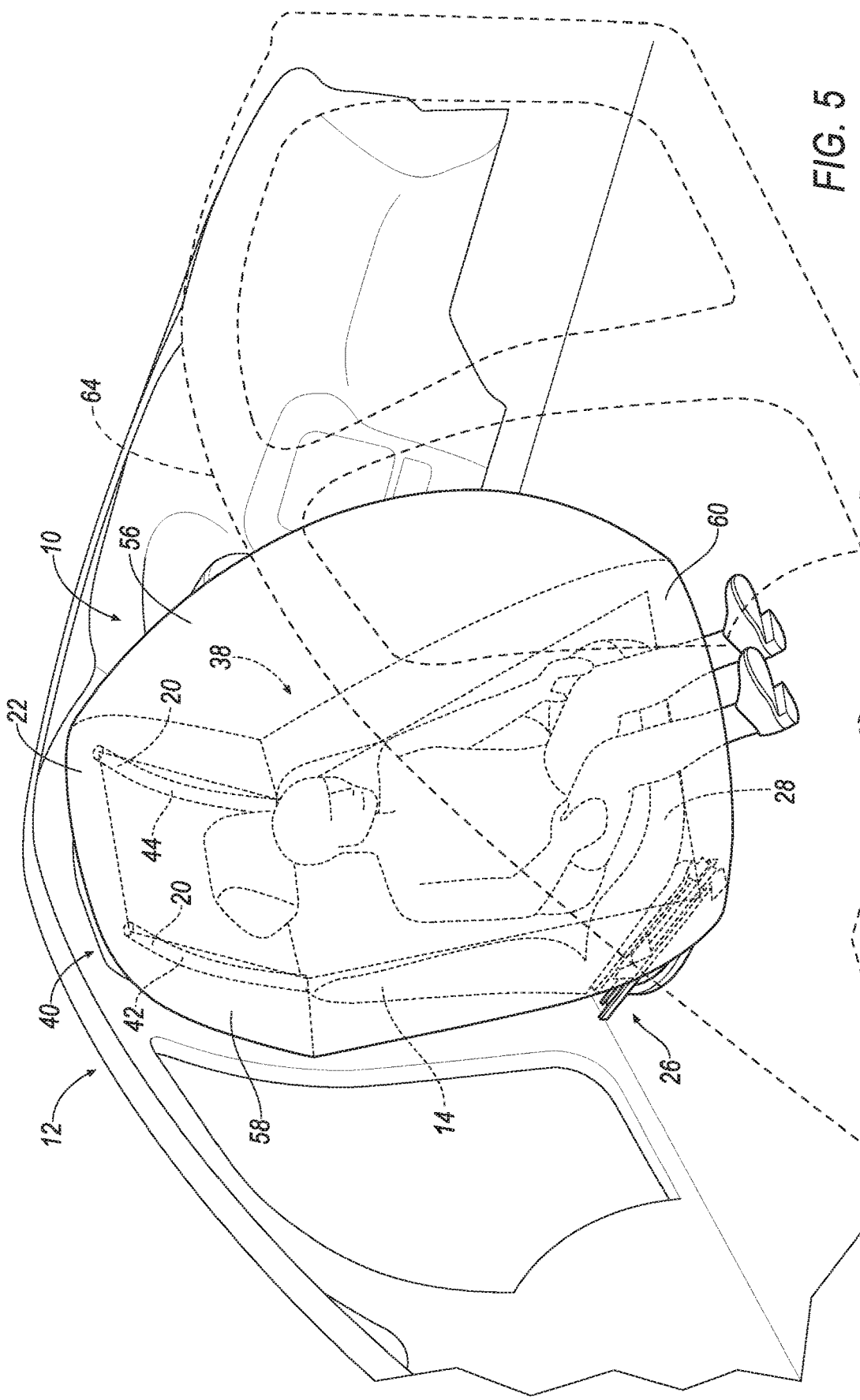
FIG. 5 is a front perspective view of the vehicle seat with the airbag in the inflated position.

The airbag 22 may include a first side panel 56 and a second side panel 58, as shown in FIGS. 4-5. The airbag 22 may include a front panel 60. The front panel 60 may be between the side panels 56, 58. The front panel 60 may control the kinematics of the test dummy moving forward from the seat back 14. The side panels 56, 58 may control the kinematics of the test dummy moving laterally from the seat back 14. The occupant seating area 38 may be between the side panels 56, 58 and below the front panel 60.

The airbag 22 may include one or more tethers 62, as shown in FIG. 4. The tethers 62 may each be connected to the airbag 22 at suitable connection points. For example, the tethers 62 may be each connected to one of the side panels 56, 58 and/or the front panel 60. The tethers 62 may control the shape of the airbag 22 in the inflated position.

As shown in FIG. 4, the airbag 22 may engage a roof 64 of the vehicle 12. The roof 64 is disposed above a passenger cabin of the vehicle 12, as shown in FIGS. 1, 3-5. In the inflated position, the airbag 22 may extend from the roof 64 to below the bottom 32 of the seat back 14. The airbag 22 may extend from the roof 64 to below the seat bottom 28. The roof 64 may act as a reaction surface for the airbag 22 during inflation. When the airbag 22 engages the roof 64 and extends below the bottom 32 of the seat back 14, the airbag 22 may control the kinematics of a lower portion of the test dummy, e.g., legs of the test dummy.

Figure 9:
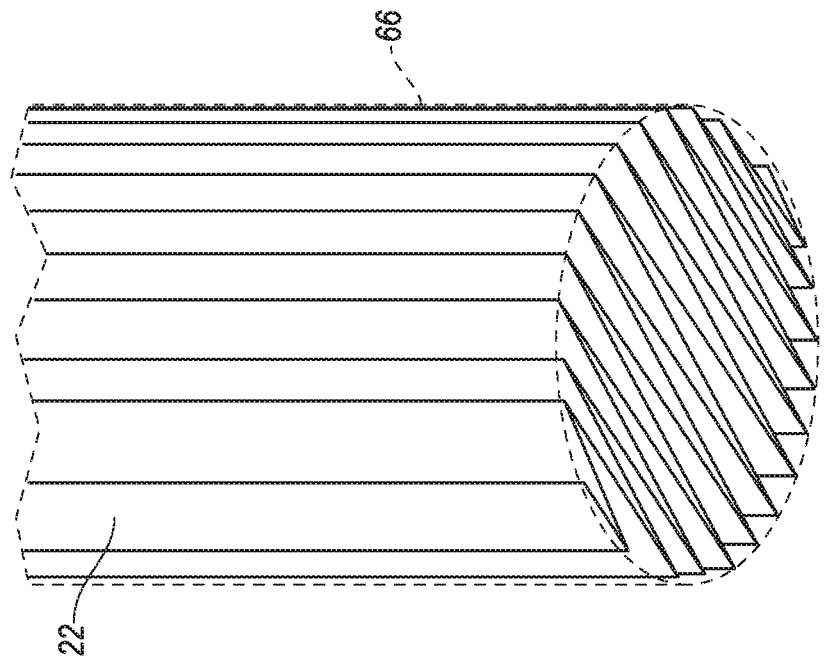
FIG. 9 is a view of the airbag folded in the cover.
Figure 8:
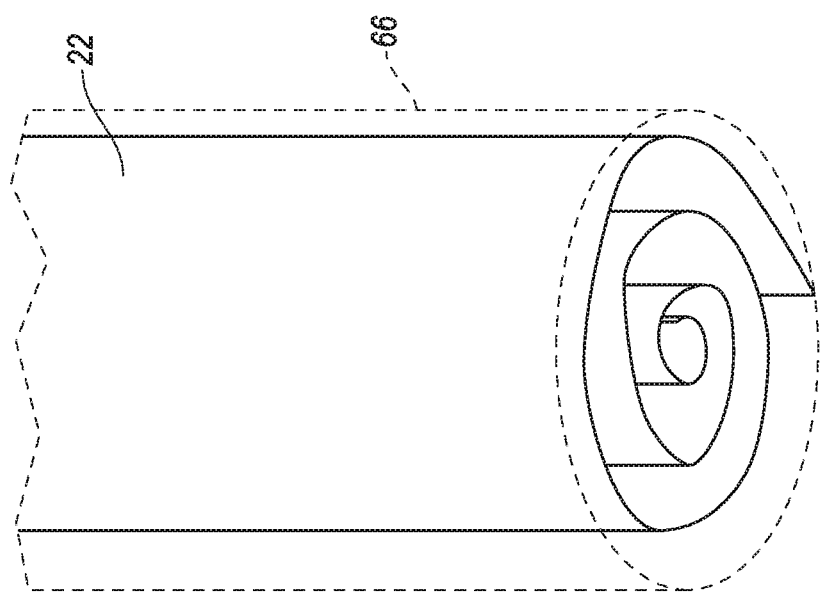
FIG. 8 is a view of the airbag rolled in a cover.

The airbag assembly 40, 40' may include a cover 66, as shown in FIGS. 1-4, 6-9. The airbag 22 may be disposed in the cover 66. The cover 66 may protect the airbag 22 from, e.g., debris, dust, etc. The airbag 22 may be rolled in the cover 66, as shown in FIG. 8. Alternatively, the airbag 22 may be folded in the cover 66, as shown in FIG. 9. Upon inflation, the airbag 22 may extend from the cover 66 over the seat back 14. The cover 66 may include a frangible opening through which the airbag 22 inflates.

Figure 3:
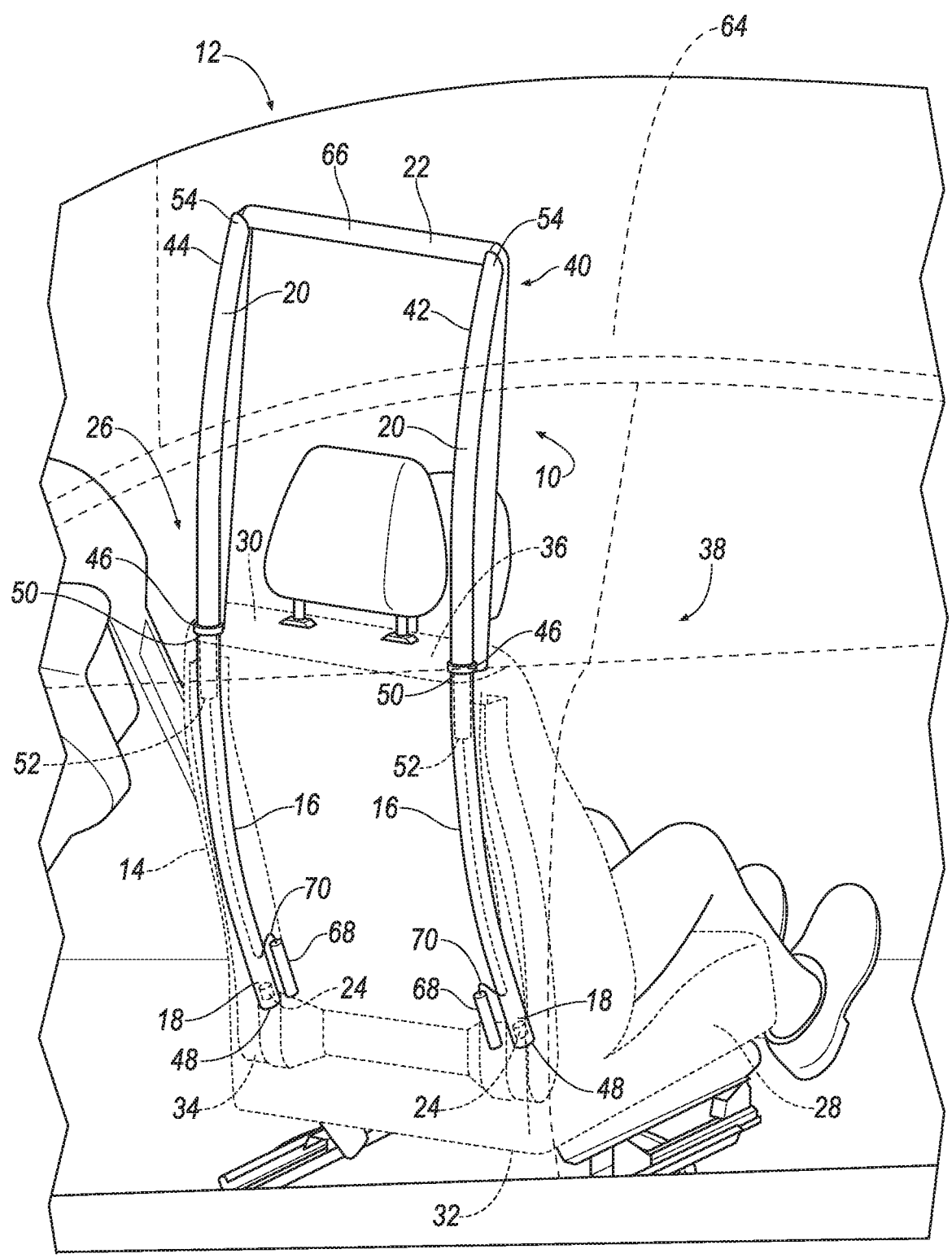
FIG. 3 is a perspective view of the airbag assembly in a deployed position.

The system 10 includes an inflator 68, as shown in FIGS. 1, 3-4, 6. The airbag assembly 40, 40' may include the inflator 68. That is, the inflator 68 may be supported by the frame 20, 20'. Alternatively, the inflator 68 may be supported by any suitable component, e.g., the housing 16, the seat back frame 34, the seat bottom 28, etc. The system 10 may include a plurality of inflators 68. For example, as shown in FIGS. 1, 3-4, the system 10 may include two inflators 68. The inflator 68 may be any suitable type, e.g., a cold-gas inflator.

Figure 6:
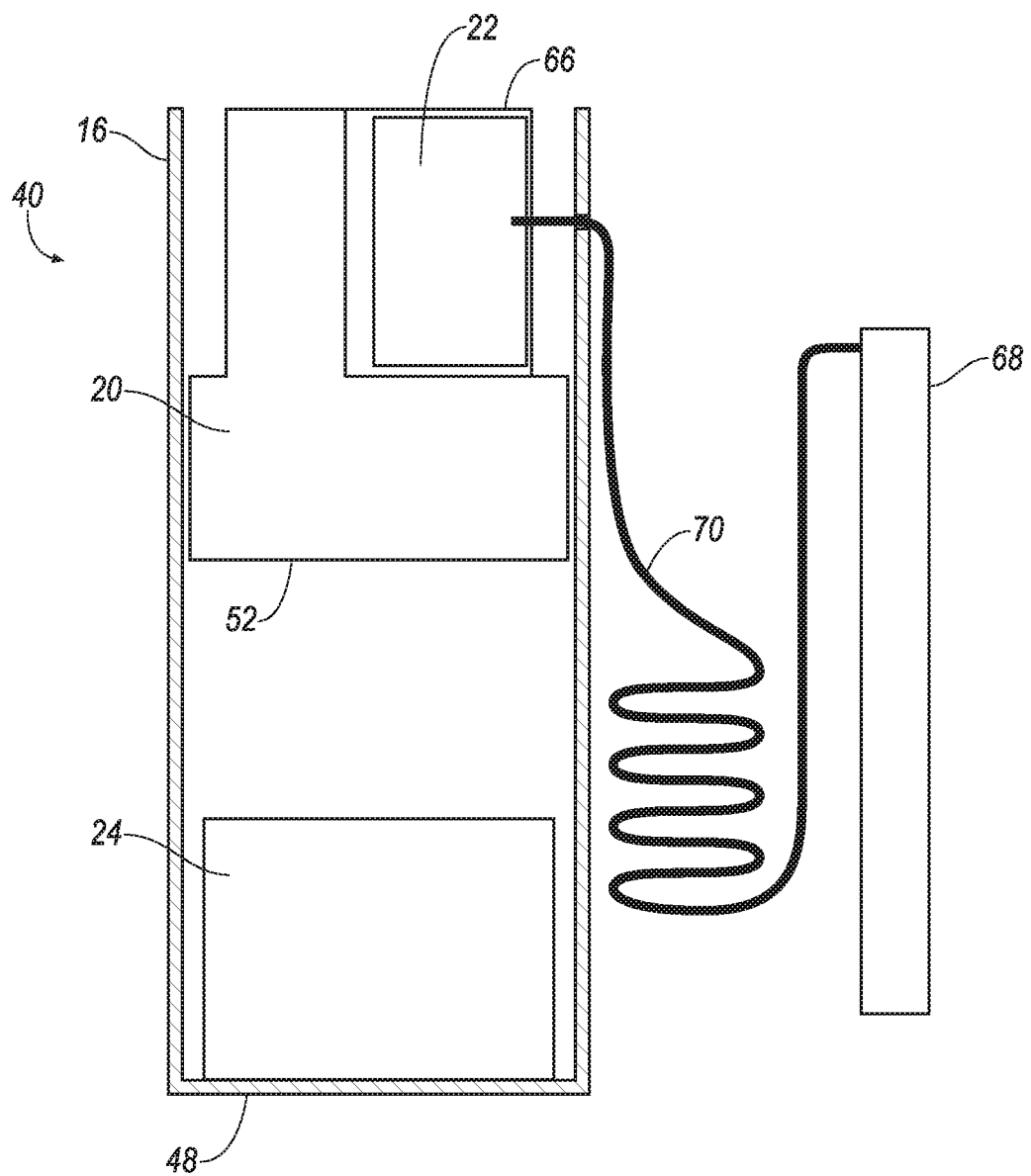
FIG. 6 is a magnified view of the airbag assembly.

Each inflator 68 includes a fill tube 70, as shown in FIGS. 1, 3-4, 6-7. The fill tube 70 communicates inflation medium from the inflator 68 to the airbag 22. The fill tube 70 is connected to the airbag 22 and to the inflator 68. The fill tube 70 may be disposed in the seat back 14 in any suitable arrangement. For example, the fill tube 70 may be coiled along the frame 20, as shown in FIG. 6. The fill tube 70 may extend through a portion of the frame 20, 20' to the airbag 22, as shown in FIG. 7.

The system 10 includes the pyrotechnic device 24, as shown in FIGS. 1, 3-4, 6. The pyrotechnic device 24 is in fluid communication with the chamber 18. The pyrotechnic device 24 deploys the frame 20 to the deployed position above the seat back 14. The pyrotechnic device 24 may be supported by the seat back 14. For example, the pyrotechnic device 24 may be fixed to the seat back 14. Alternatively, the pyrotechnic device 24 may be supported to any suitable location, e.g., the seat bottom 28, a vehicle floor, etc. As shown in FIGS. 1, 3-4, 6, the pyrotechnic device 24 may be disposed in the chamber 18.

During the impact, the pyrotechnic device 24 provides deployment medium to the chamber 18, increasing the pressure in the chamber 18. The increased pressure from the deployment medium pushes against the first end 52 of the frame 20, 20', deploying the airbag assembly 40, 40' to the deployed position. When the airbag assembly is in the deployed position, the inflator 68 provides inflation medium through the fill tube 70 to the airbag 22, inflating the airbag 22. The airbag 22 extends over the seat 86 and may extend below the bottom 32 of the seat back 14. The airbag 22 may engage the roof 64, extending from the roof 64 to below the bottom 32 of the seat back 14. The airbag 22 may cover the occupant seating area 38 of the seat 26, controlling the kinematics of the test dummy.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A system, comprising:
   a seat back including a housing having a chamber;
   a frame in the chamber and deployable from the housing above the seat back;
   an airbag supported by the frame;
   an inflator in fluid communication with the airbag; and
   a pyrotechnic device in fluid communication with the chamber;
   wherein the housing tapers from a first end to a second end, the frame tapers from a first end to a second end, and the first end of the frame is designed to engage the second end of the housing with a friction fit.

2. The system of claim 1, further comprising a roof, wherein the airbag is inflatable to an inflated position in which the airbag engages the roof.

3. The system of claim 2, wherein the seat back has a bottom and the airbag extends from the roof to below the bottom.

4. The system of claim 1, wherein the seat back has a bottom and the airbag is inflatable to an inflated position in which the airbag extends below the bottom of the seat back.

5. The system of claim 1, wherein the seat back includes a seat back frame and the housing is supported by the seat back frame.

6. The system of claim 1, wherein the pyrotechnic device is supported by the seat back.

7. The system of claim 1, wherein the pyrotechnic device is in the chamber.

8. The system of claim 1, wherein the housing is fixed to the seat back.

9. The system of claim 1, wherein the housing is integral with the seat back.

10. The system of claim 1, wherein the seat back defines an occupant seating area and the frame is beyond the occupant seating area.

11. The system of claim 1, wherein the airbag includes a pair of side panels and a front panel between the side panels.

12. The system of claim 11, wherein the seat back defines an occupant seating area and the airbag is inflatable to an inflated position in which the occupant seating area is between the side panels and below the front panel.

13. The system of claim 1, wherein the frame is rigid relative to the airbag.

14. The system of claim 1, wherein the frame includes a first member and a second member spaced from the first member.

15. The system of claim 14, wherein the airbag is supported by the first member and the second member.

16. The system of claim 1, further comprising a cover, wherein the airbag is disposed in the cover.

17. The system of claim 1, wherein the pyrotechnic device is arranged to provide deployment medium into the chamber against a first end of the frame.

18. The system of claim 4, wherein the seat back includes a top and a midpoint, and the chamber extends from the top of the seat back toward the bottom of the seat back past the midpoint of the seat back.

19. The system of claim 1, wherein the inflator includes a fill tube extending through the frame from the inflator directly to the airbag.

* * * * *